United States Patent

Goetz, Jr. et al.

[15] 3,650,584

[45] Mar. 21, 1972

[54] TELEVISION CABINET FACE ASSEMBLY

[72] Inventors: Frederick J. Goetz, Jr., Arlington Heights; Emanuel F. Piazza, Addison, both of Ill.

[73] Assignee: Motorola, Inc., Franklin Park, Ill.

[22] Filed: Nov. 23, 1970

[21] Appl. No.: 92,036

[52] U.S. Cl. .......... 312/7 TV

[51] Int. Cl. .......... A47b 81/06

[58] Field of Search .......... 312/7 TV, 204

[56] References Cited

UNITED STATES PATENTS 2,692,983 10/1954 Eisenkramer .......... 312/7 TV X 2,980,478 4/1961 Woehrle .......... 312/7 TV

FOREIGN PATENTS OR APPLICATIONS 1,192,676 10/1959 France .......... 312/7 TV

*Primary Examiner*—James C. Mitchell

*Attorney*—Vincent J. Rauner and L. N. Arnold

[57] ABSTRACT

A removable bezel member having integrally formed connector means thereon mounts on the front viewing face of a cabinet for a television receiver with a simple plug-in type connection. A front-mountable escutcheon member has a removable grille member and a removable pivotable door which mount within openings therein with simple snap-in type connections, said bezel, escutcheon and grille members and said door comprising an attachable face assembly for the cabinet to complete and complement the aesthetic appearance of the front face of said television cabinet.

12 Claims, 15 Drawing Figures

Patented March 21, 1972

3,650,584

3 Sheets-Sheet 1

INVENTORS
FREDERICK J. GOETZ, JR.
EMANUEL F. PIAZZA
BY Lester N. Arnold
ATTY.

INVENTORS
FREDERICK J. GOETZ, JR.
EMANUEL F. PIAZZA
BY Lester R. Arnold
ATTY

INVENTORS
FREDERICK J. GOETZ, JR.
EMANUEL F. PIAZZA
BY Lester N. Arnold
ATTY.

TELEVISION CABINET FACE ASSEMBLY

BACKGROUND

This invention relates to front-mountable trim parts useful to comprise face assemblies for the front viewing face of cabinets for television receivers. More particularly, this invention relates to an attachable face assembly whose component trim parts are removable and attach to each other or to the front face of the cabinet with simple plug-in or snap-in type connections.

Front-mountable trim parts are commonly provided on the front viewing face of a cabinet for a television receiver to limit the exposure to the interior of the cabinet and to critical adjustment control means for the receiver as well as to complete and complement the aesthetic appearance of said front face. Typical trim parts include bezel members, escutcheon members, various grille panels and doors.

A frame-shaped bezel member surrounds at least the picture tube and often borders the entire front face of the cabinet, and can serve to partially support the front end of the tube or be merely decorative. The decorative type bezel member can be made readily removable, as with quick mount-release type connectors, to enhance front serviceability of the receiver but as well must be made secure enough to endure handling and transportation of the receiver and durable enough to be removed numerous times without breakage of the bezel or its connectors. An additional consideration is that the release of the bezel member must be accomplished from the front face of the cabinet without any need to obtain access to the rear thereof.

The remainder of the front face of the cabinet not already occupied by the picture tube and the bezel member, is typically covered with an escutcheon member having various openings or apertures therein for providing access to certain audio reproducing and audio-image adjustment means for the tube. Some difficulty has been encountered in providing the various removable grille members and pivotable doors which cover these openings with suitable quick mount-release type features.

SUMMARY

It is therefore an object of the present invention to provide an attachable face assembly for the front viewing face of a television receiver cabinet which is provided with quick mount-release type connectors to enable the parts to be mounted and removed from the front of the cabinet.

It is another object of the invention to provide a bezel member for the face assembly which has alternative connector means thereon to provide for substitute connector means.

It is still another object of the invention to provide flexible connector means for pivotably securing a door to cover critical adjustment means for the picture tube and for biasing the door to remain in a predetermined pivot position.

An attachable face assembly for a front viewing face of a television receiver cabinet includes a removable frame-shaped bezel member having integrally formed connector means thereon for attaching the bezel member to a frame structure on the cabinet with a simple plug-in type connection. The frame structure has removable connector means aligned with only some of the integrally formed connector means so that the remainder thereof can be used as alternative connector means to prolong the useful life of the bezel member. A panel-like escutcheon member includes first and second openings therein which provide access to operational parts of the receiver with said escutcheon member mounted on the front face of the cabinet. A grille member and a pivotable door are removably secured in the first and second openings, respectively, by flexible connector means that enable the grill member and door to be attached to the escutcheon member with a snap-in type connection.

THE DRAWING

DETAILED DESCRIPTION

Figure 1:
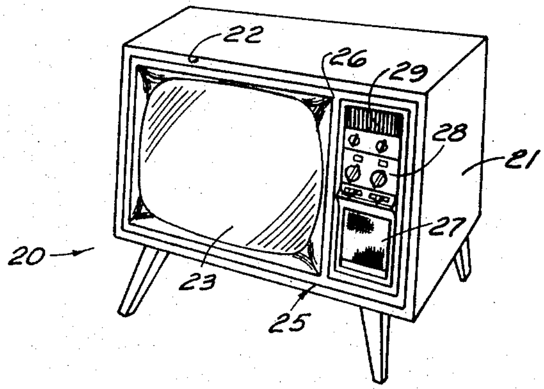
FIG. 1 is a front perspective view of a television receiver cabinet showing an attachable face assembly in accordance with the present invention.

FIG. 1 shows a television receiver 20 having a cabinet housing 21 for enclosing the operational parts of the receiver including a picture tube of which only the front image screen 23 is visible from an open front viewing face 22 for the cabinet 21. The receiver 20 additionally includes among its operational parts audio receiving and reproducing means including a speaker system (not shown) and a variety of audio-image adjustment control means some parts of which are controlled or manipulated by the various control dials and selector knobs positionable on the front face 22 of the cabinet 21. The front face 22 is then provided with various component trim parts combined to comprise an attachable face assembly 25 for the cabinet 21 which serves to limit the exposure to the interior of the cabinet 21 and to critical adjustment control means therein for the receiver 20 as well as to complete and complement the aesthetic appearance of the front face 22.

The trim parts for the attachable face assembly 25 include a generally frame-shaped bezel member 26 which at least surrounds or outlines the front image screen 23 of the picture tube; a panellike escutcheon member 28 which provides a cover for the remaining portion of the front face 22 and which contains suitable apertures therein to permit selective access to the operational parts for the receiver 20; and a grille panel or member 27 and a pivotable door 29 which are provided as removable covers for certain ones of the apertures within the escutcheon member 28.

The bezel member 26 is of the nonsupporting type, that is to say it does not support any other trim part such as the escutcheon member 28 or an operational part of the receiver 20 such as the picture tube. Hence, as contrasted to a support type function, the bezel member 26 is simply stated herein to be decorative, and preferably is constructed in the shape of a single molded framework of suitable light weight material such as plastic. The bezel member 26 of FIG. 2 defines a framework for bordering the entire front face 22 and has a first or viewing opening 31 outlining the picture tube for viewing the image screen 23 therethrough, and a second opening 32 for outlining the escutcheon member 28.

The serviceability of the receiver 20 from the front face 22 requires that the bezel member 26 be provided with suitable quick mount-release type connector means that permits the bezel member to be attached and removed from the cabinet 21 by a simple push-on pulloff type connection, and without the necessity of obtaining access to the rear of the bezel member 26 through the cabinet 21. To this end, the rear side of the bezel member 26 is provided with a plurality of or a set of integrally formed connector means in the form of spaced pairs of protruding tabs or tines 33, and the cabinet 21 is to receive a frame structure 35 by suitable attachment, which frame structure contains removable connector means in the form of receiving or female type connectors 37.

The frame structure 35 has a flat frame-shaped configuration in one of its preferred embodiments and is intended to be mounted in the interior of the cabinet 21 adjacent the front face 22 where the receiving connectors 37 will be accessible to receive the integrally formed connector means of the bezel member 26 with a plug-in or insertion type connection. An optional interior rib 34 divides the frame structure into two separate openings 31a and 32a to be complementarily aligned with the openings 31 and 32 of the bezel member 26, respectively. It is not essential for the frame structure 35 to be complementarily shaped with the bezel member 26, and so long as the frame structure 35 is adequately shaped to provide aligned receiving connectors 37 with which to attach the bezel member 26 to the cabinet 21, a variety of configurations could be utilized.

It is to be noted that the integrally formed protruding tabs 33 of the bezel member 26 are vulnerable to breakage with extensive or abusive handling, and it is for this reason that the spaced pairs thereof are utilized. It is apparent that with the use of only selected pairs of the tabs 33 and only one tab of each selected pair of tabs 33, that the unused tabs provide spares or alternative connector means by which the useful life of the bezel member 26 is significantly prolonged. Therefore the frame structure 35 need only have the capability of accommodating by the receiving connectors 37 only those tabs 33 that have been selected for use. Accordingly, the frame structure 35 is provided with a corresponding plurality or matched set of spaced pair of apertures 36 which loosely receive aligned pairs of tabs 33, respectively, with the frame structure 35 and the bezel member 26 mounted adjacently on the front face 22 of the cabinet 21.

Figure 5:
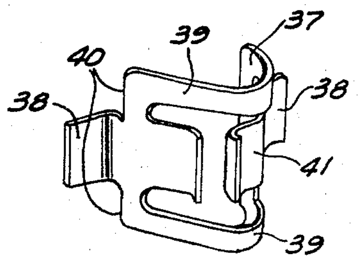
FIG. 5 is an enlarged perspective view of the removable connector means of FIG. 2.

The apertures 36 of the frame structure 35 are sufficiently large to receive the insertable tabs 33 therein without any contact. It is now possible to provide suitable receiving connector means such as the female connectors 37 which are readily removable so that the connectors 37 can be changed to different apertures as desired. FIG. 5 shows a preferred embodiment of the female connectors 37, although other suitable embodiments can be used, wherein a pair of opposite extensions 38 are insertable into a selected aperture 36 by compressing a pair of arcuate spring strips 39 until the extensions 38 can be passed through the aperture. Shoulder portions 40 limit the extent of the insertion and the extensions 38 prevent the withdrawal of the connectors 37. A pair of central springlike jaws 41 are provided for receiving the insertable tab 33 and clamp thereon with sufficient force to retain the tab. If desired, the tabs could be made relatively soft or the free end portion of the tabs 33 could be provided with a slightly bulged or enlarged portion to aid their retention by the jaws 41.

The spaced pairs of tabs 33 of the frame structure 35 are merely a matter of design choice wherein approximately the same tab location on the frame structure is provided as an alternative connector means. The frame structure 35 could as well be provided with a plurality of spaced single tabs 33 (not shown), and the apertures 36 of the frame structure aligned accordingly.

Figure 2A:
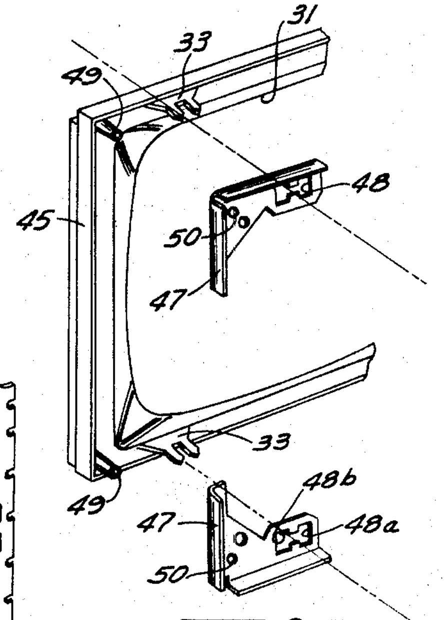
FIG. 2A is a partial rear perspective view of alternative embodiments for the bezel member and frame structure of FIG. 2.

A mirror-image portion of an alternative embodiment of the bezel member 26 and its accompanying frame structure are shown in FIG. 2A at 45 and 47, respectively. The alternative bezel member 45 defines only the viewing opening 31 and contains a set of spaced pairs of tabs 33, one pair substantially in each of is corner areas. The complete alternative frame structure 47 is comprised of four separate corner brackets attachable to the cabinet 21 (only two of which are shown), each corner bracket having a single aperture 48 for insertedly receiving the aligned pair of tabs 33 in the same noncontacting manner as explained for bezel member 26 and frame structure 35.

Each of the apertures 48 is shaped to functionally define two separate and adjacent apertures 48a and 48b, each one of which can be used to accommodate one of the removable female type connectors 37 in providing for the same alternative mounting capacity as described for the bezel member 26. Also, the bezel members and their associated frame structures can be provided with aligned pair of apertures, such as indicated at 49 and 50 in FIG. 2A, suitable to receive conventional type fasteners or connector means if more secure fastening of the bezel member is desired or required.

Figure 2:
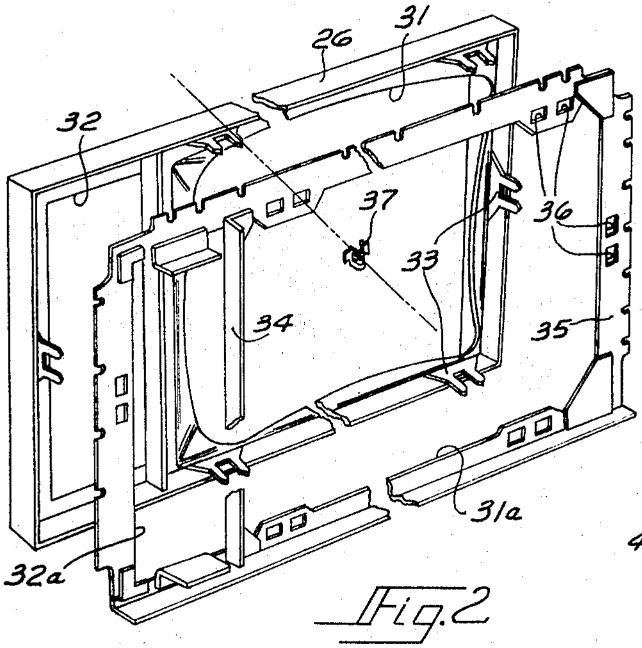
FIG. 2 is a rear perspective view of a bezel member and a frame structure for the face assembly and showing a removable connector means therefor.
Figure 2B:
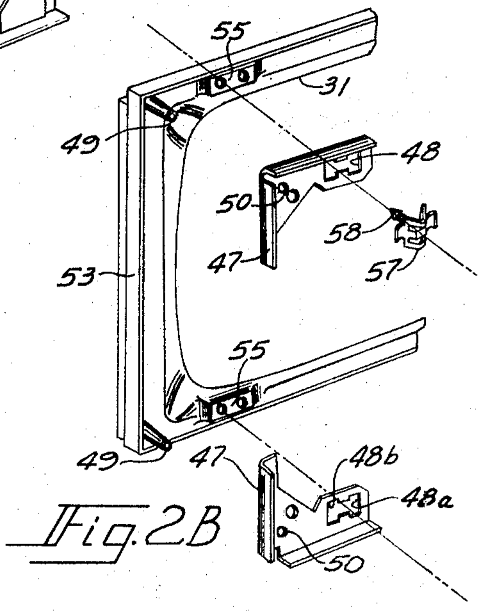
FIG. 2B is a partial rear perspective view of alternative embodiments for the bezel member, frame structure and removable connector means of FIG. 2.

A mirror-image portion of still another alternative embodiment of the bezel member 26 is shown at 53 in FIG. 2B being combined with the separate corner brackets 47 (only two of which are shown). It is apparent that the integrally formed connector means on the rear of the bezel members 26 and 45 of FIG. 2 and 2A optionally could be either male type or female type connector means so long as the removable connector means attachable to the frame structures 35 and 47 are made complementary thereto. Hence, the alternative bezel member 53 has a plurality of or a set of integrally formed connector means in the form of spaced pairs of receiving apertures 55, and male type removable connector means 57 are attachable within the apertures 48 of the corner brackets 47.

Figure 6:
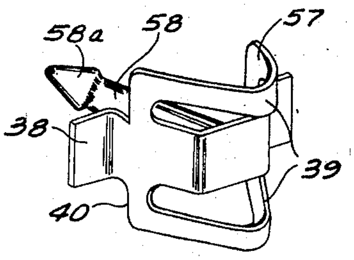
FIG. 6 is an enlarged perspective view of an alternative embodiment for the removable connector means of FIG. 2.

As shown in FIG. 6, the male type connector 57 is very similar to the female type connector 37, the same reference numerals being used to designate similar parts, except for the central prong or tine 58 which is shown as having an enlarged end portion or bulb 58*a* on its free end to provide a more secure forced fit between the prong 58 and its aligned aperture 55.

The panellike escutcheon member 28 is suitably attached to the remaining portion of the front face 22 not already covered by the picture tube and the associated bezel member, said attachment being by means of standard type fasteners inserted through apertures in the escutcheon, a pair of which are shown at 61. As shown in FIGS. 1 and 2, the escutcheon member 28 is insertedly received within the openings 32 and 32a of the bezel member 26 and the frame structure 35, respectively; if bezel members such as 45 and 53 are used, the escutcheon member 28 would be positioned adjacent thereto.

The escutcheon member 28 serves as a mounting shield for the various front-mountable control dials and selector knobs used to manipulate and adjust the receiver 20. Inner edge portions of the escutcheon member define the apertures that permit selective access to the operational parts of the receiver 20 so that the escutcheon member 28 need not be removably attached with quick mount-release type connector means. Also, the escutcheon member 28 attaches to the front face of a drawerlike chassis (not shown) internal to the cabinet 21 that serves as a housing for the operational parts. This chassis removes from the cabinet 21 such as by sliding through opening 32a of the frame structure 35 with the bezel member 26 removed to permit access to the operational parts for servicing of the receiver 20, thus reinforcing the lack of need to mount the escutcheon member 28 by the quick mount-release type connector means.

The grille member 27 and the pivotable door 29 are removably secured within first and second openings, respectively, located within top and bottom portions of the escutcheon member 28 as viewed in FIG. 1, which openings are indicated at 63 and 62 in FIGS. 3 and 7, respectively, and are hereinafter referred to as speaker opening 63 and selector opening 62. The speaker opening 63 permits access to speaker means for the audio reproducing system for the receiver 20, and the selector opening 62 contains critical audio-image adjustment means for the receiver 20.

Figure 3:
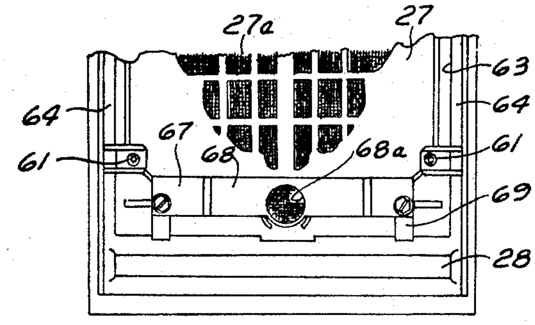
FIG. 3 is a rear view of the bottom portion of an escutcheon member for the face assembly showing a grille member mounted therein by first flexible connector means.
Figure 4:
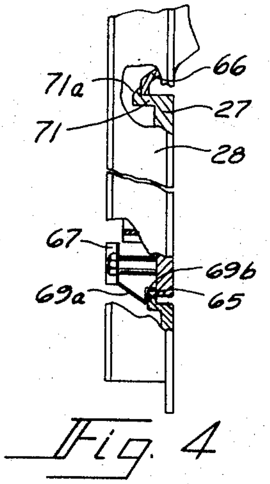
FIG. 4 is a partial side view of a larger bottom portion of the escutcheon member having cutaway portions thereof to illustrate the cooperation between the escutcheon member, grille member and the flexible connector means of FIG. 3.

The speaker opening 63 desirably has defining side edge portions 64, FIG. 3, which limit the penetration of the grille member 27 through the opening 63. As best shown in FIG. 4, a lower edge portion 65 and a top edge portion 66 of the speaker opening 63 serve as functional mounting edges in receiving the grille member 27. Grille member 27 contains a central portion 27*a*, FIG. 3, to permit the passage of audio signals from the speaker system, and is removably secured within the speaker opening 63 by a first flexible connector means in the form of a single connector 67 having an elongated central portion 68 which may be provided with a notch 68*a* for attaching a microphone unit to be used with the receiver 20. In providing for attaching the grille member 27, the single connector 67 includes a pair of oppositely spaced flexure members 69 extending outwardly therefrom, as shown in FIG. 4, in a direction away from the direction of movement required to mount the grille member 27.

FIG. 4 shows the single connector 67 secured to the lower rear portion of the grille member 27 so that the flexure members 69 are interferingly aligned with the lower edge portion 65 of the speaker opening 63. Each of the flexure members 69 is springlike and will return to its stable position when forced therefrom, and includes a cam surface 69*a*, FIG. 4, which will strike the edge portion 65 to force the flexure member 69 thereover with a snap-in type connection as the grille member 27 is moved into the speaker opening 63.

To complete the manner in which the grille member 27 is secured within the speaker opening 63, a top edge portion 71 of the grille member is provided with a rim or shoulder portion 71*a* which is engageable with the rear side of the top edge portion 66 of the speaker opening 63 with the flexure members 69 snapped over the lower edge portion 65. This engagement is provided and maintained by means of a first shoulder portion 69*b* on each of the flexure members 69 which bears against the lower edge portion 65 to bias the grille member 27 upward within the speaker opening 63. The grille member 27 is removable from the speaker opening 63 by a simple pushdown pullout type movement where the grille member is forced down against the bias of the flexure member 69 until the rim portion 71 of the grille member is cleared.

Figure 4A:
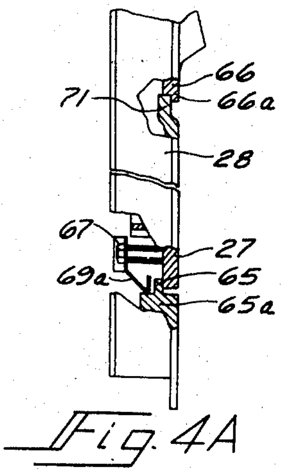
FIGS. 4A, 4B and 4C are partial side views respectively, of alternative embodiments for the escutcheon member, grille member and flexible connector means of FIGS. 3 and 4, and having cutaway portions thereof similar to those of FIG. 4.
Figure 4B:
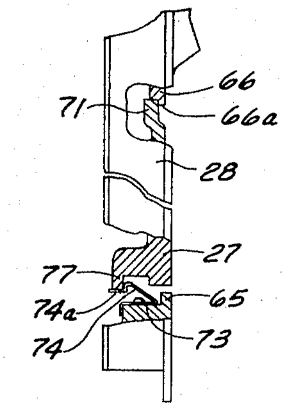
Figure 4C:
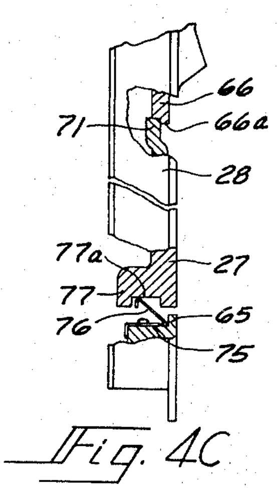

Alternative embodiments for the grille member 27, flexure members 69 and the lower and top edge portions 65 and 66 of the speaker opening 63 are shown in FIG. 4A, 4B and 4C, the same reference numerals used to designate similar parts, wherein the top edge portion 66 includes a downwardly extending rim portion 66*a* which extends over the top edge portion 71 of the grille member 27 in lieu of the rim portion 71*a* on the grille member 27. The first shoulder portion 69*b* is changed in FIG. 4A to a first shoulder portion 65*a* inwardly adjacent the lower edge portion 65 on the escutcheon member 28. The flexure member 69 bears against this shoulder portion 65*a* to bias the grille member 27 upward.

In FIGS. 4B and 4C, the single connector 67 is replaced by connectors 73 and 75, respectively, secured to the escutcheon member 28 inwardly adjacent the lower edge portion 65 of the speaker opening 63. The connectors 73 and 75 have flexure members 74 and 76, respectively, which are interferingly aligned with a lower edge portion 77 of the grille member 27 to provide the snap-in type connection. The flexure member 74 includes a first shoulder portion 74a which bears against the lower edge portion 77 of the grille member 27 to bias the same upward within the speaker opening 63. The grille member 27 as shown in FIG. 4C includes a first shoulder portion 77a inwardly adjacent the lower edge portion 77 to provide the bearing surface by which the flexure member 76 forces the grille member 27 upward within the speaker opening 63.

Figure 7:
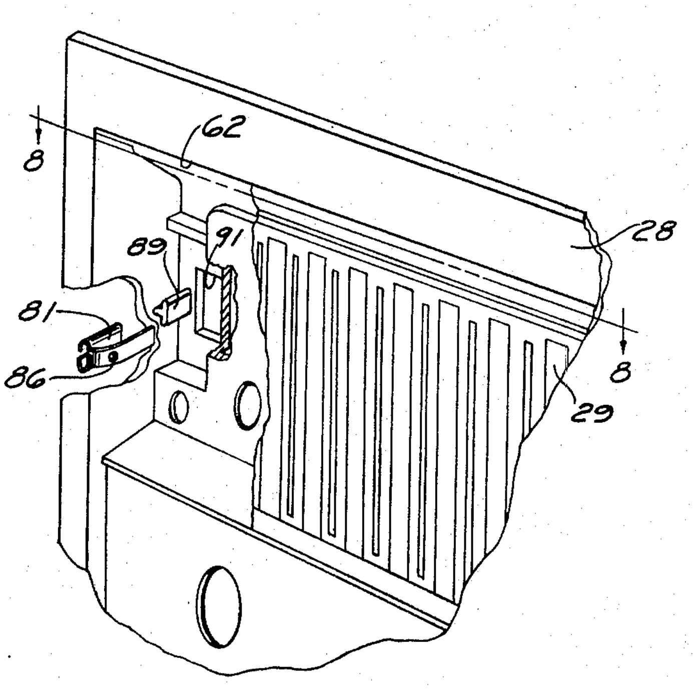
FIG. 7 is a fragmentary front perspective view of the escutcheon member of FIG. 3 showing a pivotable door mounted therein by second flexible connector means.
Figure 8:
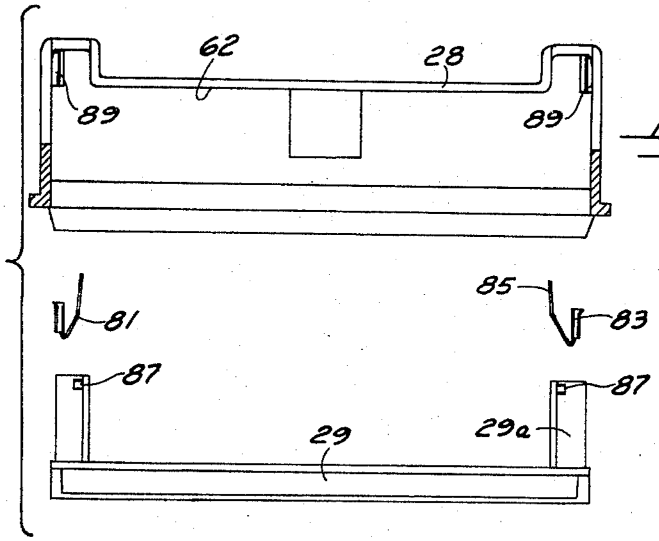
FIG. 8 is a partial sectional top view generally taken along the line 8—8 of FIG. 7 except showing the door and the second flexible connector means exploded therefrom to illustrate the assembly of parts.

FIG. 7 shows the pivotable door 29 mounted within the selector opening 62 and providing a cover for the critical audio-image adjustment means therein. The door 29 is pivotable between open and closed positions and is connected to the escutcheon member 28 through second flexible connector means in the form of a pair of generally U-shaped bladelike compression spring clips 81 as shown in FIG. 7–10. Each of the generally U-shaped clips 81 has a pair of leg portions, one leg portion of which is shaped to form a generally C-shaped clamping portion 83 and the other leg portion of which comprises an extending flexure member 85. The flexure members 85 are springlike and will tend to return to their stable position when forced therefrom. Each flexure member includes an aperture 86 therein for receiving a suitably shaped protruding tab or boss 87 on the door 29.

The pivotable door 29 is provided with a pair of opposite and spaced arm portions 29a, each of which contains one of the protruding bosses 87 thereon. Internal to the selector opening 62, opposite and spaced edge portions of the escutcheon member 28 include generally T-shaped protruding tabs or bosses 89, respectively. In the manner of mounting the spring clips 81 and the door 29 within the selector opening 62, the clamping portions 83 of the clips 81 are slipped over the bosses 89 to comprise a socket type connection, and thereafter the door 29 is inserted into the selector opening 62 so that the bosses 87 are received within the apertures 86 in the flexure members 85 with a snap-in type connection. The flexure members 85 are compressed with the door 29 mounted so that the spring clips 81 assert an inward bias on the arm portions 29*a* to bias the door 29 to remain in both the open and closed positions.

The clamping portions 83 of the spring clips 81 comprise a pair of socket receptacles to receive the bosses 89 as part of socket type connector means, and the pair of apertures 86 comprise part of snap-in type connector means. The door 29 is removable from the front of the selector opening 62 by the release of the socket type connection as the clamping portions 83 will slide from the bosses 89 if the clamping portions 83 are not made unduly tight thereon. A pair of windows 91, only one of which is shown in FIG. 7, are provided through the escutcheon member 28 within the selector opening 62 adjacent the bosses 89 to permit rear access to the spring clips 81 and provide outlets for the extending flexure members 85 whereby the flexure members are accessible for forcing the bosses 87 from the aperture 86 to also remove the door 29 from the selector opening 62.

Figure 9:
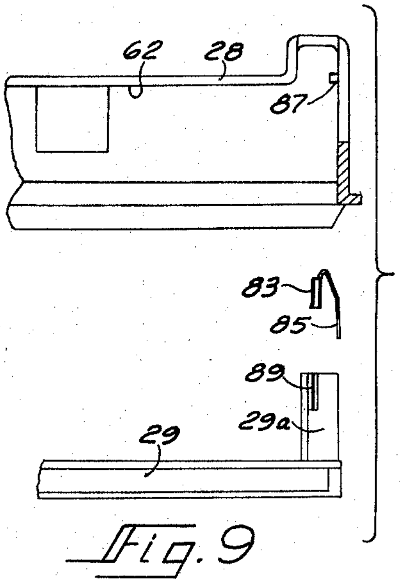
FIG. 9 is a partial top view of an alternative embodiment for the assembly of parts of FIG. 8.
Figure 10:
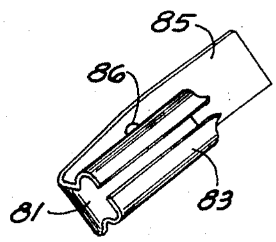
FIG. 10 is a perspective view of the second flexible connector means of FIG. 7.

FIG. 9 shows an alternative mounting between the door 29, spring clips 81 and the escutcheon member 28 wherein the T-shaped protruding bosses 89 are provided on the door 29 and the protruding bosses 87 are provided on the escutcheon member 28. The spring clips 81 are simply reversed for connecting to the bosses 87 and 89 in the same manner as above described. The door 29 can be removed from the front face 22 of the cabinet 21 by simply disengaging the socket type connection between the bosses 89 and the clamping portions 83 with a forward movement of the door 29. With the door 29 in the open position or from the window 91, front and rear access to the flexure members 85 are possible in order to release the snap-in type connection.

It is to be understood that while the present invention has been shown and described with reference to the preferred embodiments thereof, the invention is not limited to the precise forms set forth, and that various modification and changes may be made therein without departing from the spirit and scope of the present invention.

I claim:

1. An attachable face assembly for a front viewing face of a television cabinet having a picture tube comprising a frame-shaped bezel member defining a viewing opening for viewing the picture tube therethrough with said bezel member mounted over at least one portion of said front face and having integrally formed connector means thereon, a frame structure securable to said cabinet adjacent said bezel member and having removable connector means thereon aligned with at least some of said integrally formed connector means for removably attaching said bezel member to said cabinet with a plug-in type connection, a panellike escutcheon member to be mounted over the other portion of said front face and having inner edge portions defining first and second openings therein, a grille member to be removably mounted within said first opening, first flexible connector means securable to one of said grille member and said escutcheon member and including a first portion interferingly aligned with one edge portion of the other of said grille member and said escutcheon member for removably attaching said grille member with a snap-in type connection, a pivotable door to be removably mounted within said second opening, second flexible connector means securable to one of said escutcheon member and said door with a socket type connection and securable to the other of said escutcheon member and said door with a snap-in type connection for removably attaching said door to said escutcheon member and for biasing said door to remain in a fixed pivot position whereby said bezel member, said escutcheon member, said grille member and said door complement the aesthetic appearance of the front face of said television cabinet.

2. An attachable face assembly as claimed in claim 1 wherein said integrally formed connector means include one set of a set of protruding connector means and a set of receiving connector means and said removable connector means include the other set of said set of protruding connector means and said set of receiving connector means.

3. An attachable face assembly as claimed in claim 2 wherein said set of integrally formed connector means is randomly spaced at least about the periphery of said viewing opening, said frame structure includes a corresponding set of spaced apertures aligned with said integrally formed connector means with said bezel member mounted on said front face, and said set of removable connector means is securable within selectable ones of said apertures for connecting with selectable ones of said aligned integrally formed connector means to removably attach said bezel member to said cabinet and to provide alternative ones of said aligned integrally formed connector means by which to mount said bezel member.

4. An attachable face assembly as claimed in claim 2 wherein said set of integrally formed connector means include a plurality of spaced pairs thereof randomly positioned at least about the periphery of said viewing opening, and said frame structure includes a plurality of spaced apertures corresponding to said plurality of pairs of said integrally formed connector means and aligned therewith with said bezel member mounted on said front face, and each of said set of removable connector means is securable within selectable ones of said apertures for connecting with selectable ones of each of said aligned pairs of integrally formed connector means to removably attach said bezel member to said cabinet and to provide alternative ones of each of said aligned pairs of integrally formed connector means by which to mount said bezel member.

5. An attachable face assembly as claimed in claim 1 wherein said first portion of said first flexible connector means includes at least one outwardly extending flexure member biased to return to one position and having a cam surface interferingly aligned with said one edge portion to move said flexure member thereover with said grille member being mounted within said first opening, and one of said grille member and said escutcheon member has an extending rim portion interferingly engageable with another edge portion of the other of said grille member and said escutcheon member, said other edge portion being opposite from said one edge portion, with said flexure member returned to said one position.

6. An attachable face assembly as claimed in claim 5 wherein the other of said grille member and said escutcheon member includes a first shoulder portion adjacent said one edge portion and engageable with said flexure member with said flexure member returned to said one position for biasing said rim portion into engagement with said other edge portion whereby said grille member is retained within said first opening.

7. An attachable face assembly as claimed in claim 5 wherein said flexure member has a first shoulder portion engageable with said one edge portion with said flexure member returned to said one position for biasing said rim portion into engagement with said other edge portion whereby said grille member is retained within said first opening.

8. An attachable face assembly as claimed in claim 1 wherein said second flexible connector means includes a pair of generally U-shaped bladelike compression spring clips having a pair of leg portions respectively, one leg portion of each of said clips includes a socket receptacle and the other leg portion thereof includes an aperture therein, one of said escutcheon member and said door includes a first pair of oppositely spaced protruding bosses for being received within said socket receptacles to comprise said socket type connection and the other of said escutcheon member and said door includes a second pair of oppositely spaced protruding bosses for being received within said apertures to comprise said snap-in type connection.

9. An attachable face assembly for a front viewing face of a cabinet for a television receiver having a picture tube comprising a frame-shaped bezel member defining a viewing opening for viewing the picture tube therethrough with said bezel member mounted over at least one portion of said front face, a frame structure securable to said cabinet rearwardly adjacent said bezel member, protruding connector means securable to one of said bezel member and said frame structure, and receiving connector means securable to the other of said bezel member and said frame structure and aligned with at least some of said protruding connector means for removably attaching said bezel member to said cabinet with a plug-in type connection, said connector means securable to said bezel member being integrally formed thereon and said connector means securable to said frame structure being removable whereby said integrally formed and said removable connector means provide alternative connector means for said bezel member.

10. An attachable face assembly as claimed in claim 9 wherein said frame structure includes spaced apertures therethrough aligned with said integrally formed connector means on said bezel member, and said removable connector means are removably attached within selectable ones of said apertures for connecting with selectable ones of said aligned integrally formed connector means to provide alternative integrally formed connector means by which to mount said bezel member to said cabinet.

11. An attachable face assembly for the front viewing face of a cabinet for a television receiver having a picture tube comprising a panellike escutcheon member defining a first access opening for providing access to critical adjustment means of said picture tube therethrough with said escutcheon member mounted over one portion of said front face, a pivotable door to be removably mounted within said access opening, first portions of socket type connector means on one of said escutcheon member and said door, first portions of snap-in type connector means on the other of said escutcheon member and said door, a pair of generally U-shaped bladelike compression spring clips, each of said clips having a pair of leg portions including second portions of socket type connector means on one of said leg portions to be connected with an associated one of said first portions thereof to secure said clips thereto with a socket type connection, and second portions of snap-in type connector means on the other of said leg portions to be connected with an associated one of said second portions thereof to secure said clips thereto with a snap-in type connection whereby said door limits the access to said critical adjustment means.

12. An attachable face assembly as claimed in claim 11 wherein said first portions of said socket type connector means and said first portions of said snap-in type connector means are first and second pairs of protruding tabs, respectively, and said second portions of said socket type connector means and said second portions of said snap-in type connector means are a pair of socket receptacles and a pair of apertures, respectively.

* * * * *